US012355048B2

(12) United States Patent
Azzouz et al.

(10) Patent No.: US 12,355,048 B2
(45) Date of Patent: Jul. 8, 2025

(54) COOLING DEVICE OF AN ELECTRICAL STORAGE SYSTEM AND METHOD USING THE COOLING DEVICE

(71) Applicant: Valeo Systemes Thermiques, Le Mesnil Saint-Denis (FR)

(72) Inventors: Kamel Azzouz, Le Mesnil Saint Denis (FR); Amrid Mammeri, Le Mesnil Saint Denis (FR); Sébastien Garnier, Le Mesnil Saint Denis (FR)

(73) Assignee: Valeo Systemes Thermiques

( * ) Notice: Subject to any disclaimer, the term of this patent is extended or adjusted under 35 U.S.C. 154(b) by 895 days.

(21) Appl. No.: 17/610,828

(22) PCT Filed: May 12, 2020

(86) PCT No.: PCT/EP2020/063229
§ 371 (c)(1),
(2) Date: Nov. 12, 2021

(87) PCT Pub. No.: WO2020/229493
PCT Pub. Date: Nov. 19, 2020

(65) Prior Publication Data
US 2022/0216540 A1  Jul. 7, 2022

(30) Foreign Application Priority Data

May 15, 2019 (FR) ...................................... 1905091

(51) Int. Cl.
*F28B 1/02* (2006.01)
*F28C 3/00* (2006.01)
(Continued)

(52) U.S. Cl.
CPC ........... *H01M 10/6569* (2015.04); *F28B 1/02* (2013.01); *F28C 3/005* (2013.01); *H01M 10/613* (2015.04);
(Continued)

(58) Field of Classification Search
CPC ............. H01M 10/613; H01M 10/625; H01M 10/6567; H01M 10/6568; H01M 10/6569; F28B 1/02
See application file for complete search history.

(56) References Cited

U.S. PATENT DOCUMENTS 5,907,473 A * 5/1999 Przilas ............... H05K 7/20345
174/15.1
2007/0133173 A1 6/2007 Hsiung et al.
(Continued)

FOREIGN PATENT DOCUMENTS

CN 101275068 A 10/2008
CN 103107384 A 5/2013
(Continued)

OTHER PUBLICATIONS

Office Action issued in counterpart Chinese Patent Application No. CN 202080049210.3 mailed Nov. 6, 2023 (6 pages).
International Search Report with Written Opinion in corresponding International Application No. PCT/EP2020/063229, mailed Aug. 25, 2020 (11 pages).

*Primary Examiner* — Frantz F Jules
*Assistant Examiner* — Jason N Thompson
(74) *Attorney, Agent, or Firm* — Osha Bergman Watanabe & Burton LLP

(57) ABSTRACT

The invention relates to a condenser (3) of a cooling device (2) of at least one battery element (103) of a motor vehicle, configured to liquefy a dielectric fluid deposited in the form of vapor at the surface of said condenser, characterized in that the condenser comprises at least one main wall (6) and a plurality of secondary walls projecting from the main wall and participating in forming a chamber for receiving one or more battery elements. The condenser comprises a cooling fluid circuit provided in the thickness of the main wall and at least one dielectric fluid circuit in liquid form provided in (Continued)

the thickness of at least one secondary wall, said electrical fluid circuit being equipped with at least one nozzle for projecting the dielectric fluid.

10 Claims, 8 Drawing Sheets

(51) Int. Cl.
*H01M 10/613* (2014.01)
*H01M 10/625* (2014.01)
*H01M 10/6556* (2014.01)
*H01M 10/6568* (2014.01)
*H01M 10/6569* (2014.01)
*H01M 50/209* (2021.01)
*F28D 21/00* (2006.01)

(52) U.S. Cl.
CPC ..... *H01M 10/625* (2015.04); *H01M 10/6556* (2015.04); *H01M 10/6568* (2015.04); *H01M 50/209* (2021.01); *F28D 2021/0063* (2013.01); *H01M 2220/20* (2013.01)

(56) References Cited

U.S. PATENT DOCUMENTS

| | | | |
|---|---|---|---|
| 2011/0151302 A1* | 6/2011 | Kim | H01M 10/613 |
| | | | 429/120 |
| 2013/0122331 A1* | 5/2013 | McDonald | H01M 10/625 |
| | | | 429/50 |
| 2015/0208549 A1 | 7/2015 | Shedd et al. | |
| 2016/0359211 A1* | 12/2016 | Kenney | H01M 10/6557 |
| 2017/0179551 A1* | 6/2017 | Shepard | H01G 11/82 |
| 2019/0131674 A1* | 5/2019 | Lu | H01M 10/6568 |

FOREIGN PATENT DOCUMENTS

| | | |
|---|---|---|
| CN | 203279429 U | 11/2013 |
| CN | 107004793 A | 8/2017 |
| CN | 113330623 A | 8/2021 |
| CN | 113330624 A | 8/2021 |
| DE | 102007014387 A1 | 10/2008 |
| FR | 3037727 A3 | 12/2016 |
| WO | 2020/099738 A1 | 5/2020 |
| WO | 2020/099739 A1 | 5/2020 |

* cited by examiner

[Fig.1]
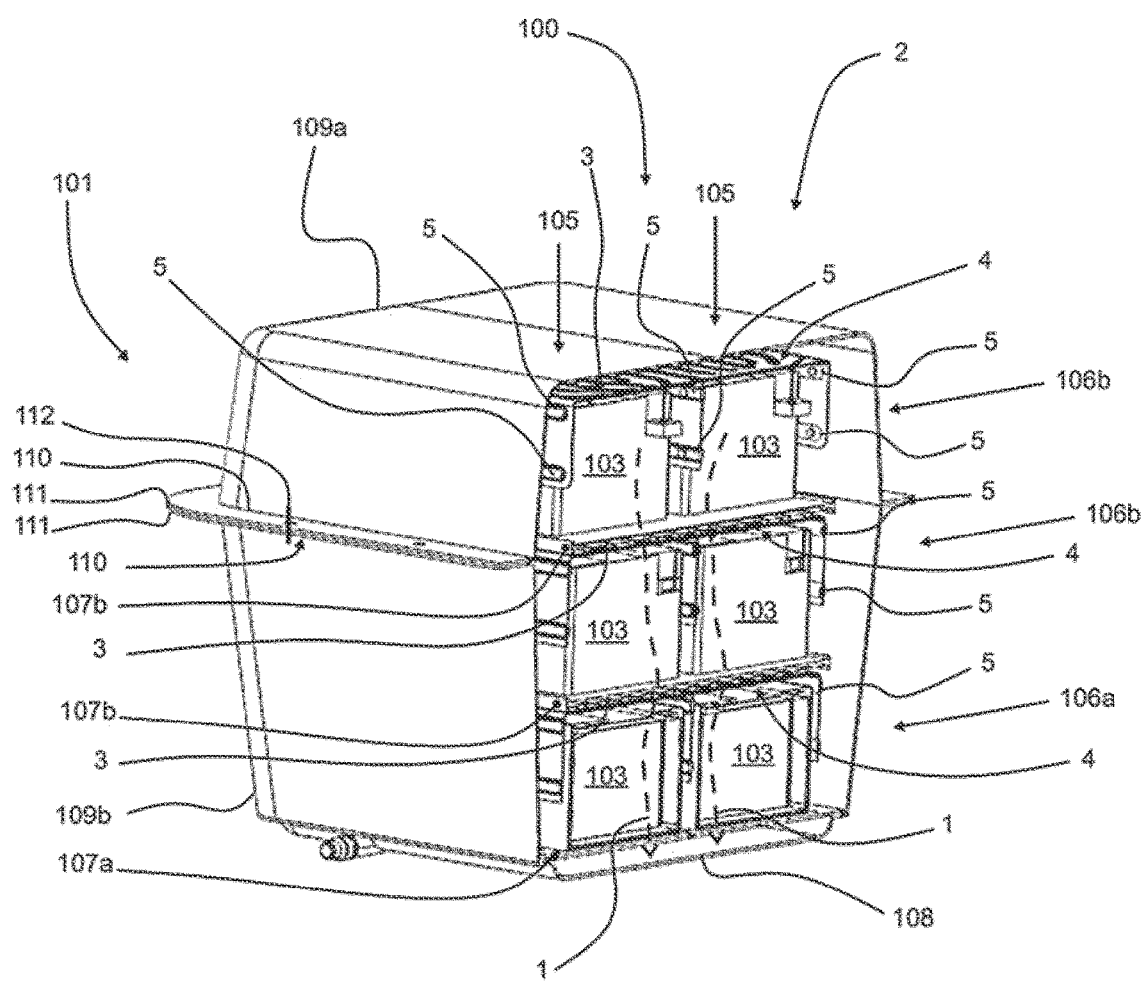

[Fig.2]
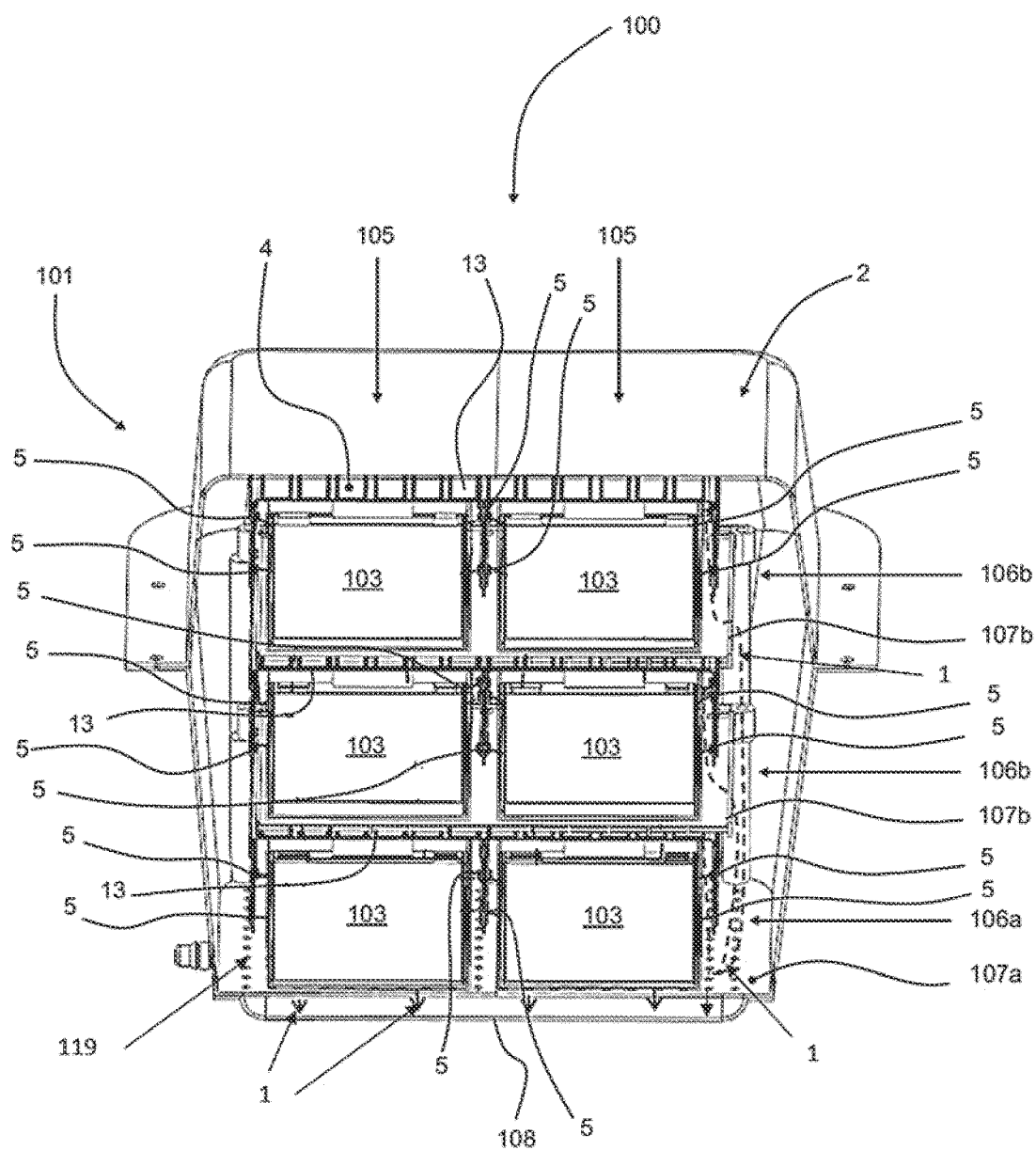

[Fig.3]
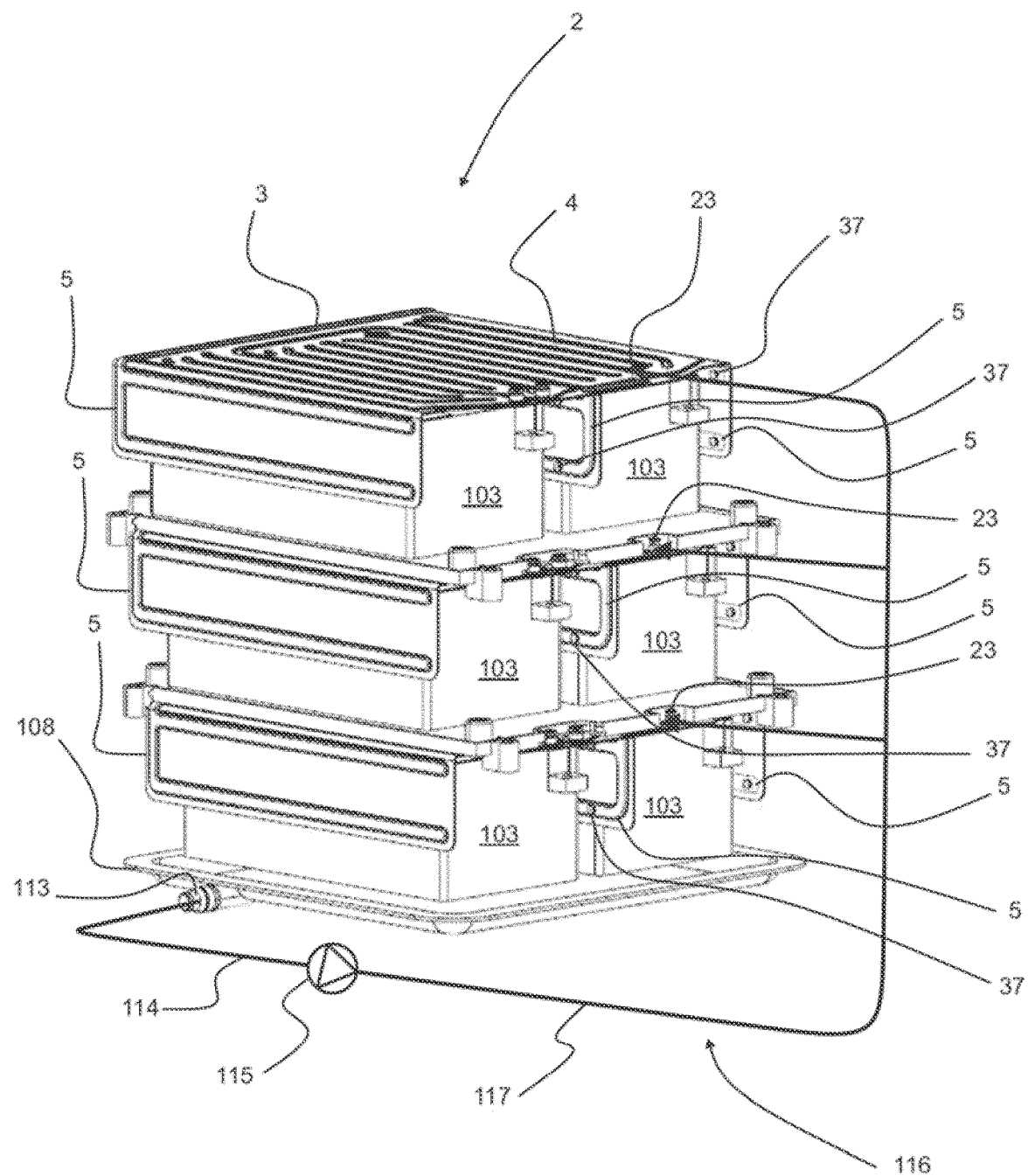

[Fig.4]
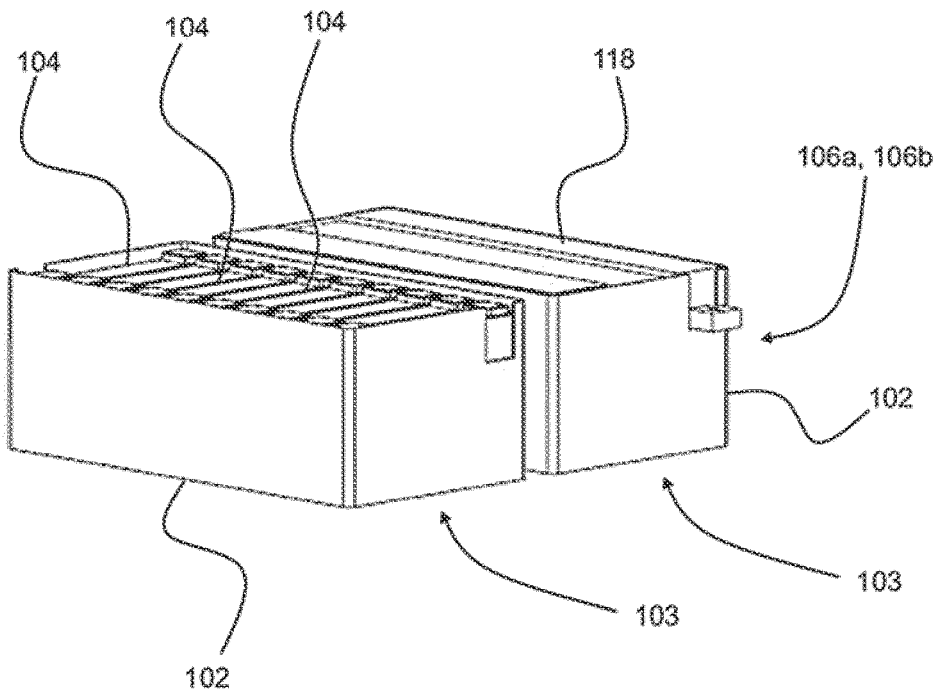
[Fig.5]
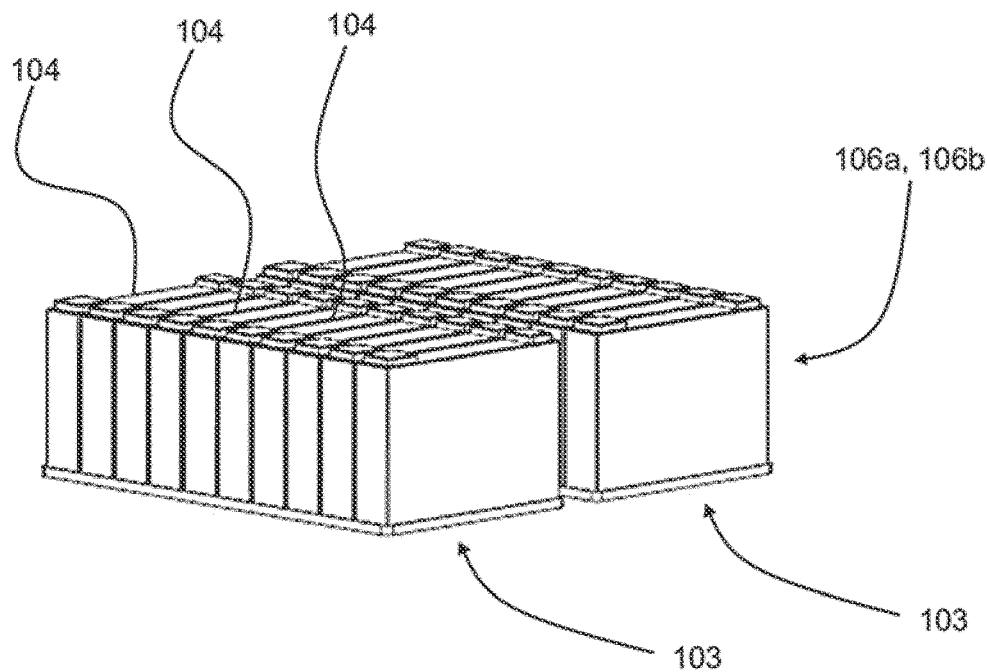

[Fig.6]
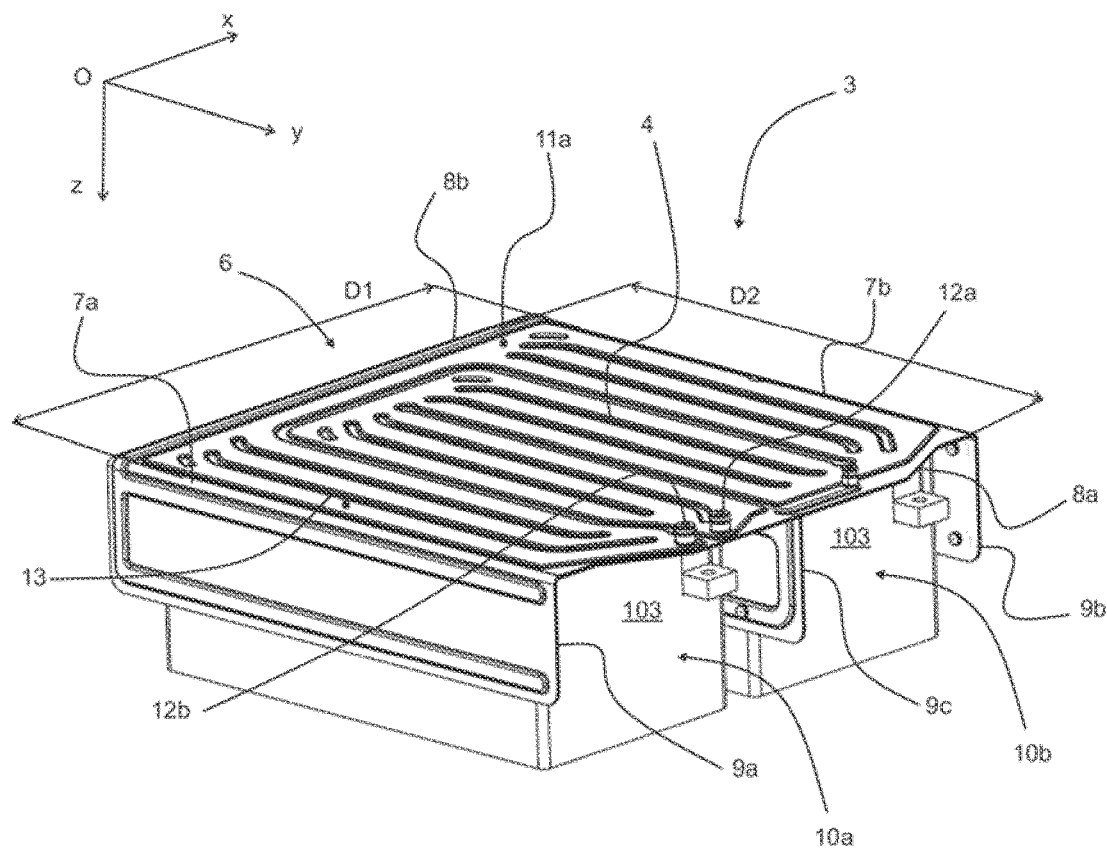

[Fig.7]
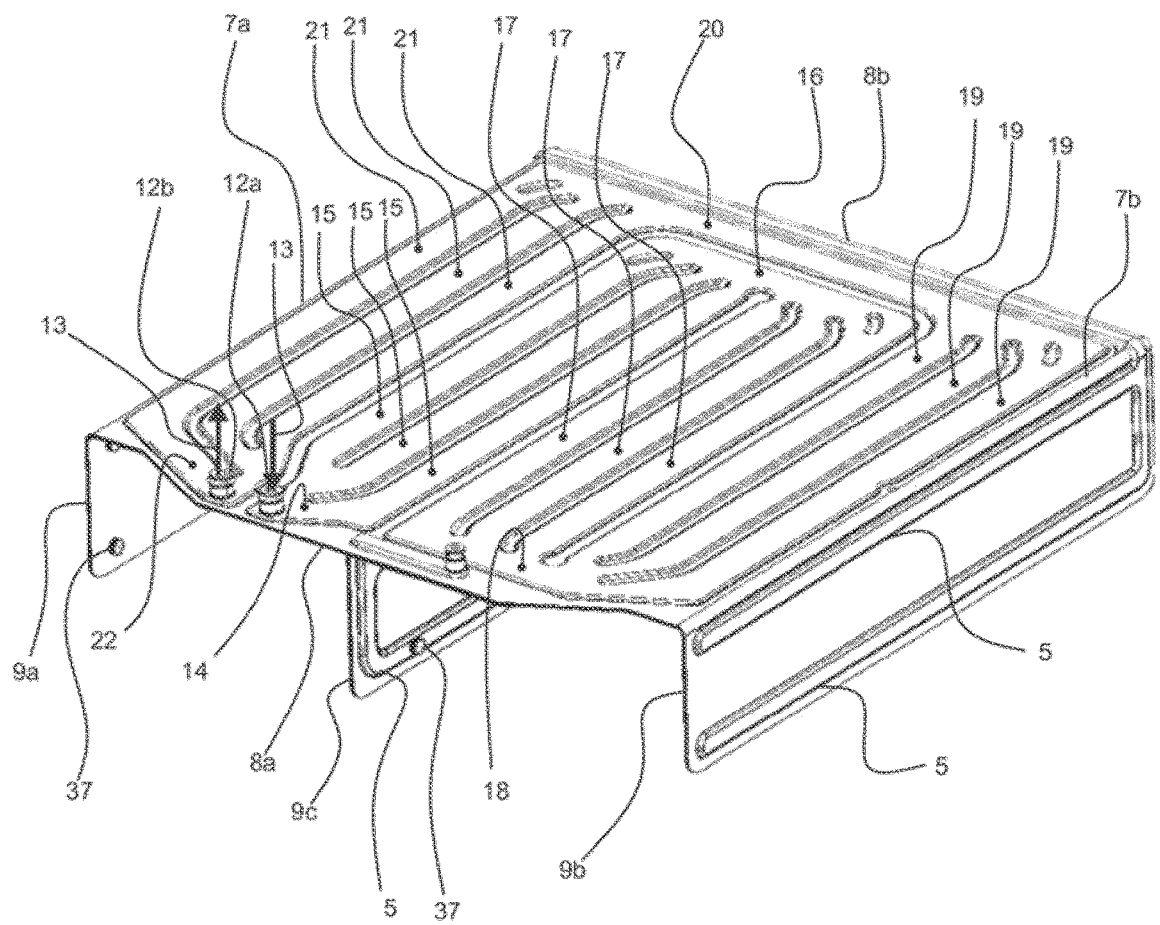

[Fig.8]
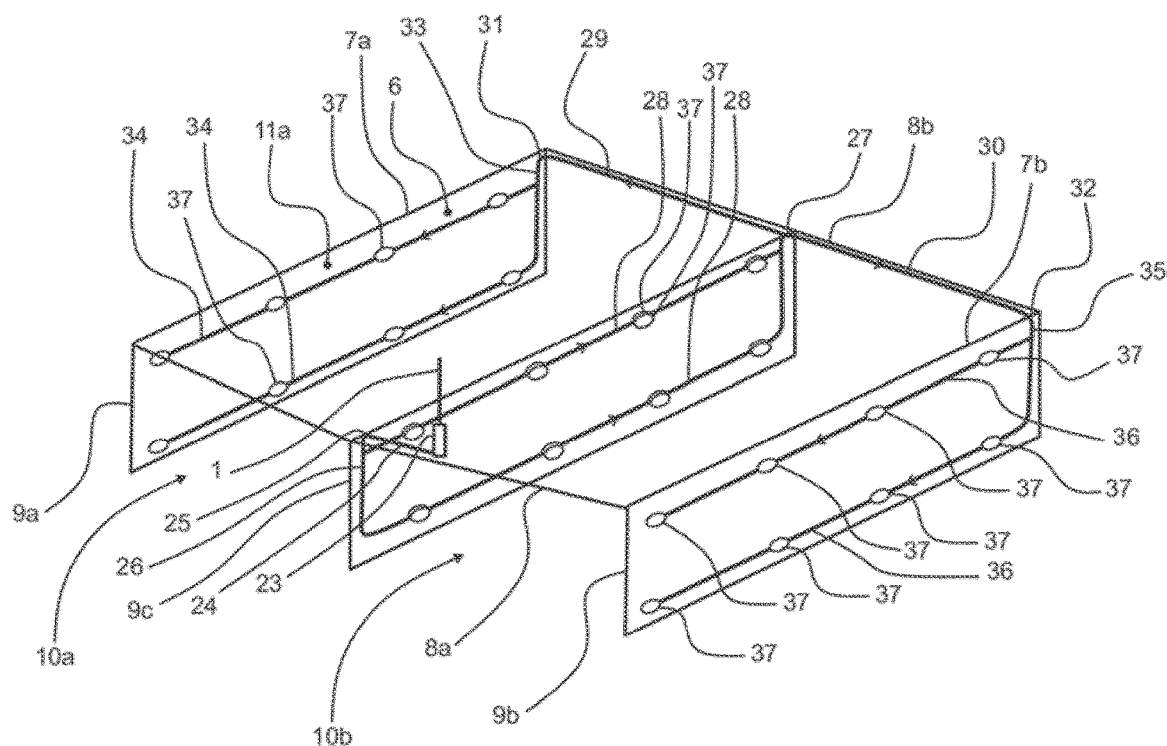

[Fig.9]
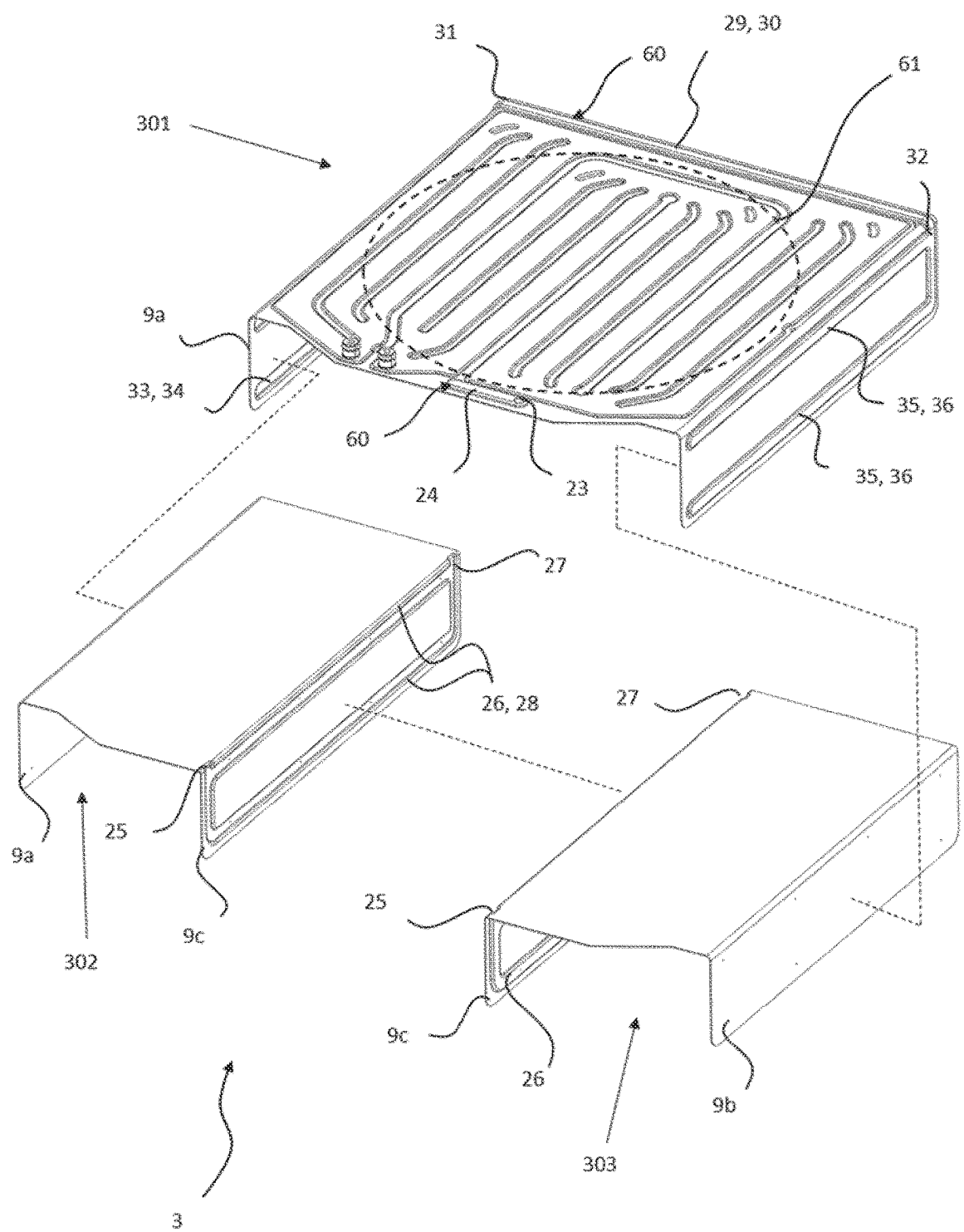

COOLING DEVICE OF AN ELECTRICAL STORAGE SYSTEM AND METHOD USING THE COOLING DEVICE

The present invention is in the field of devices for heat treatment of the electrical storage systems of a motor vehicle, and more particularly it relates to a device for cooling battery elements which can heat up. The present invention also relates to a method which uses the cooling device.

In the field of motor vehicles, heat treatment devices make it possible to modify a temperature of an electric battery, and in particular to decrease the temperature of the electric battery, which tends to heat up when it is being used. In general, heat treatment devices of this type for electric batteries use heat exchangers. In particular, the different battery cells of an electrical storage system can be cooled by means of a cold plate, in the interior of which a cooling fluid circulates, the plate being in contact with the battery cells to be cooled. It has been found that heat exchangers of this type can lead to non-homogeneous cooling of the electric batteries of a single electrical storage system, thus giving rise to a decrease in the performance levels of these electric batteries. These heat treatment devices also have a high level of thermal resistance, because of the thicknesses of material which are present between the cooling fluid and the battery cells, another parameter contributing to the high level of thermal resistance being the contact between the cooling plates, the thermal interfaces (PAD) and the surfaces of the cells.

For the purpose of providing a solution to these different problems, a plurality of devices are known.

In particular, document FR3037727 is known, in which a device for cooling of electric batteries of electric or hybrid cars is disclosed. More particularly, this document relates to a device for cooling the cells of the electric batteries of a battery pack of the ion-lithium type. It comprises a hermetically closed housing, in which a diphase fluid circulates, and a layer of air. The electrical storage cells are partly immersed in the diphase fluid, such that the heat exchange between the cells and the diphase fluid is ensured. Thus, the cooling of the electric batteries is carried out by immersion of the cells of the electric batteries in said fluid. The reserve for the diphase liquid consists of a tank which is situated on the exterior of the housing, and is connected to said housing in order to permit the circulation of the diphase fluid.

However, the immersion of the electrical storage cells in a fluid, in particular a dielectric fluid, does not permit homogeneous cooling of the cells.

The objective of the invention is to provide an alternative for cooling of battery elements by eliminating the aforementioned problems of the prior art, by proposing a cooling device which lowers and homogenizes the temperature of the battery element, thus optimizing the service life and the performance of the battery element of this type, in particular of an electrical storage system for a motor vehicle.

More particularly, the aim of the invention is to protect a condenser of a cooling device of this type, which device permits implementation of cooling of battery cells by spraying of a dielectric fluid.

According to the present invention, the condenser of a device for cooling at least one battery element of a motor vehicle, which condenser is configured to liquefy a dielectric fluid deposited in vapor form on the surface of said condenser, is characterized in that the condenser comprises at least one main wall and a plurality of secondary walls projecting from the main wall, and participating in forming a chamber for receipt of one or a plurality of battery elements, the condenser comprising a cooling fluid circuit which is provided in the thickness of the main wall, and at least one dielectric fluid circuit in liquid form which is provided in the thickness of at least one secondary wall, said electrical fluid circuit being equipped with at least one nozzle for spraying of the dielectric fluid.

"Circuit provided in the thickness" means both a configuration with ducts hollowed in the material, and a configuration with shells added on against one another in order to form a wall of the condenser, at least one of the shells being embossed in order to form a channel of said circuit.

The condenser according to the invention can comprise at least any one of the following technical characteristics, taken alone or in combination:

the cooling fluid circuit is provided only in the thickness of the main wall, and the dielectric fluid circuit extends in the thickness of the main wall and of each of the secondary walls;

the main wall is provided on one of its faces with a cooling fluid inlet and a cooling fluid outlet between which the cooling fluid circuit extends;

the dielectric fluid circuit is provided in a peripheral area of the main wall, such as to leave clear a central area for the cooling fluid circuit. Thus, the condenser can assure its first function of liquefying the vaporized dielectric fluid after it has been sprayed onto the battery elements, the vaporized fluid being able to be present on all of the surface of the main wall of the condenser, which wall is configured to overlie the battery element, without this condensation functional surface being disrupted by the passage of a dielectric fluid at a temperature different from that of the cooling fluid.

a single side of the main wall is equipped with a dielectric fluid inlet, with the cooling fluid inlet and with the cooling fluid outlet, in order to facilitate a connection with cooling fluid supply means and dielectric fluid supply means of the main wall;

the plurality of secondary walls projecting from the main wall comprises a first lateral secondary wall which equips a first longitudinal end of the main wall, a second lateral secondary wall which equips a second longitudinal end of the main wall, and an intermediate secondary wall which is interposed between the lateral secondary walls, the intermediate secondary wall participating in delimiting, respectively with part of the main wall and one and the other of the lateral secondary walls, two chambers for receipt of a battery element;

the dielectric fluid circuit comprises a plurality of branches in parallel on each of the secondary walls, such as to spray the dielectric fluid over different heights of the battery elements;

spraying nozzles are placed on each of the opposite faces of the intermediate secondary wall.

The invention also relates to a cooling device comprising a first housing and a plurality of stages of battery elements placed in the first housing, each stage of battery elements being equipped with at least one condenser as previously described, the condenser being placed relative to the battery elements of the corresponding stage such that the nozzles can spray the dielectric fluid onto the battery elements of a single stage, said system additionally comprising a container for recuperation of the dielectric fluid, which container is common to the plurality of stages of battery elements, the cooling device comprising means for recirculation of the dielectric fluid which are provided with a pump, and connect the recuperation container to at least one dielectric fluid inlet which each of the dielectric fluid circuits comprises.

The battery elements are arranged with stepped superimposition, forming a plurality of battery element stages, and each battery element stage can comprise one or a plurality of battery elements. Thus, the cooling device can comprise a plurality of battery elements distributed in a plurality of battery element columns and a plurality of stages, each battery element stage being provided with a condenser and a dielectric fluid circuit which can spray the dielectric fluid onto the battery elements of the corresponding stage. In this case, irrespective of the configuration and number of stages and battery elements per stage, the device is configured such that a recuperation container is able to receive the dielectric fluid which is sprayed onto each of the stages of a given series of battery elements, and that a pump is able to supply the series of dielectric fluid circuits with dielectric fluid coming from the recuperation container, thus permitting spraying of the given series of battery elements.

The cooling device can comprise a plate which is placed in the first housing in order to support each of the stages of battery elements, each plate being configured to permit flowing by means of gravity of the dielectric fluid to the recuperation container. This configuration can consist of one or a plurality of holes provided in the plate, or of a passage created between the plate and the walls to delimiting the first housing, the dimensions of the plate thus being smaller than those of the first housing on the plane of the plate concerned.

At least one plate, in particular the lower plate, on which a stage of battery elements rests, in particular the lower stage, can be pierced by a plurality of orifices in order to permit filtering of the dielectric fluid to the recuperation container.

Other characteristics and advantages of the invention will become even more apparent, on the one hand, from the following description and, on the other hand, from a plurality of non-limiting exemplary embodiments that are given by way of indication with reference to the attached schematic drawings, in which:

FIG. 1 illustrates a view in perspective of a cross-section of an electrical storage system equipped with a device for cooling of battery elements according to the present invention;

FIG. 2 illustrates a view from the front of the cross-section of the storage system represented in FIG. 1;

FIG. 3 illustrates a partial view in perspective of the storage system illustrated in FIGS. 1 and 2, a first housing being in particular removed in order to show the cooling device clearly, and to illustrate schematically a recirculation duct and a pump of the cooling device;

FIG. 4 illustrates a view in perspective of a first variant of battery elements which can be cooled by the cooling device represented in FIGS. 1 to 3;

FIG. 5 illustrates a view in perspective of a second variant of battery elements which can be cooled by the cooling device represented in FIGS. 1 to 3;

FIG. 6 illustrates a view in perspective of a condenser which constitutes a variant embodiment of the cooling device represented in FIGS. 1 to 3, and is designed to cool the battery elements illustrated in FIG. 4 or FIG. 5;

FIG. 7 illustrates a view in perspective of the condenser illustrated in FIG. 6;

FIG. 8 illustrates a schematic view of the condenser illustrated in FIGS. 6 and 7, in order to show the dielectric fluid circulation channels which are present in the thickness of the condenser;

FIG. 9 illustrates an exploded view in perspective of the condenser illustrated in FIGS. 6 to 8.

The characteristics, variants and different embodiments of the invention can be combined with one another, in various combinations, provided that they are not mutually incompatible or exclusive. In particular, it is possible to conceive of variants of the invention comprising only a selection of characteristics described hereinafter, isolated from the other characteristics described, if this selection of characteristics is sufficient to provide a technical advantage or to differentiate the invention from the prior art.

In particular, all the variants and all the embodiments described can be combined with one another if nothing opposes this combination from a technical point of view In the figures, elements common to a number of figures keep the same reference sign.

In FIG. 1, a motor vehicle with electric or hybrid motorization is provided with an electrical storage system 100 which is designed to supply electrical energy to an electric motor which equips the motor vehicle for the purpose of its travel. The electrical storage system 100 comprises a first housing 101 which accommodates a plurality of battery elements 103.

The first housing 101 comprises two half-shells 109a, 109b, consisting of a first shell 109a and a second shell 109b, which are arranged in the form of a pan and are joined to one another by means of their rims 110. For this purpose, each rim 110 is provided with a lip 111, the lip 111 of the first shell 109a being secured on the lip 111 of the second shell 109b by means of reversible joining means 112, of the screwing type or the like.

The battery elements 103 are in the form of a parallelepiped, and are arranged relative to one another by being placed in stepped superimposition. More particularly, the battery elements 103 are stacked on one another according to a plurality of columns 105, while being distributed according to a plurality of stages 106a, 106b. In other words, each stage 106a, 106b of battery elements 103 preferably comprises a plurality of battery elements 103 according to the number of columns 105, on the understanding that the number of stages and columns of battery elements varies according to the space allowed for the first housing, and according to the quantity of electrical energy to be stored. In a single stage 106a, 106b of battery elements 103, the elements are placed side by side, and each stage 106a, 106b of battery elements 103 is supported by a plate 107a, 107b on which the battery elements 103 rest.

According to the example illustrated, there are six battery elements 103, which are distributed in two columns 105 and three stages 106a, 106b, each column 105 comprising three battery elements 103, and each stage 106a, 106b comprising two battery elements 103. As has been stated, the number of columns 105 and the number of stages 106a, 106b are liable to be different from the example illustrated, and in particular to be a greater number.

As they are put into operation, the battery elements 103 tend to heat up. Thus, the motor vehicle is equipped with a device 2 for cooling the battery elements 103. Advantageously, the cooling device 2 according to the present invention is able to cool each of the stages 106a, 106b of battery elements 103 simultaneously. For this purpose, the cooling device 2 associates at least one dielectric fluid circuit 5, which is designed to spray a dielectric fluid 1 onto a corresponding stage 106a, 106b of battery elements 103, and at least one condenser 3 which accommodates a cooling fluid circuit 4, which is designed to take from a vapor state to a liquid state the dielectric fluid 1 which is sprayed onto the battery elements 103, and is transformed into vapor form under the effect of the heat released by the battery elements.

In particular, the cooling fluid 4 can consist of a coolant or a coolant fluid, and for example can consist of glycolated water, R134a or 1234yf, or also of $CO_2$, without this list being limiting.

The dielectric fluid is selected according to its point of change of phase. For example, in this case, the fluid selected must have an evaporation temperature at atmospheric pressure of more than 32, 33 or 34° Celsius, and a condensation temperature lower than 31, 30 or 29° Celsius.

In other words, the dielectric fluid which is sprayed in liquid form onto the battery elements of a given stage recuperates calories released by these battery elements, and is thus transformed into vapor. The vapor rises in order to come into contact with the condenser 3, in the interior of which a cooling fluid can circulate, and the condenser recuperates the calories previously stored by the dielectric fluid until it is liquefied. In liquid form, and as drops, the dielectric fluid falls by means of gravity into the first housing.

More particularly, the cooling device according to the present invention comprises as many dielectric fluid circuits 5 as the first housing 101 accommodates stages 106a, 106b of battery elements 103. Even more particularly, the cooling device 2 according to the present invention advantageously comprises as many condensers 3 as the first housing 101 accommodates stages 106a, 106b of battery elements 103. In addition, each dielectric fluid circuit 5 is advantageously associated with a corresponding condenser 3, in order to optimize condensation of the dielectric fluid 1, and consecutively cooling of the battery elements 103 stage by stage, an association of this type being the most compact one possible in the interior of the first housing 101 which delimits a required confined space which is as small as possible.

As can be seen more particularly in FIG. 2, the cooling device 2 comprises the first housing 101, a base of which constitutes a container 108 for recuperation of the dielectric fluid 1 which flows by means of gravity from one stage 106a, 106b of battery elements 103 to a lower stage 106a, 106b of battery elements 103. More particularly, the recuperation container is used for the recuperation of dielectric fluid which has been vaporized by each of the condensers. For this purpose, each of the plates which supports the stages of battery elements is configured to permit the passage of fluid by means of gravity in the direction of the recuperation container.

From amongst the plates 107a, 107b on which a respective stage 106a, 106b of battery elements 103 rests, a lower plate 107a can be distinguished, on which a lower stage 106a of battery elements 103 rests. It is understood that the lower stage 106a is the one of the stages 106a, 106b which does not overlie any other stage, and is thus the lowest of the stages 106a, 106b of the stepped superimposition of the battery elements 103 previously described, with reference to a vertical arrangement, and in the direction of flow by means of gravity of the dielectric fluid in liquid form. It is also understood that the upper stages 106b of battery elements 103 supported by a corresponding upper plate 107b overlie at least one other stage 106a, 106b of battery elements 103.

Having made this distinction, it should be noted that the lower plate 107a is pierced with a plurality of orifices 119, which permit the flow of the dielectric fluid through the plate in the direction of the recuperation container. The orifices 119 have dimensions such as to permit an operation of filtering of the dielectric fluid before it penetrates into the recuperation container. In order to make possible an efficient filtering operation, the lower plate 107a has dimensions such as to be in contact on its periphery with the walls which delimit the first housing.

It should also be noted that the upper plates 107b have a solid, non-pierced surface, and that they have dimensions such as to form a peripheral passage between the periphery of the corresponding plate and the walls which delimit the first housing. It is understood that these upper plates 107b overlie a lower stage, and thus a condenser, and that it is not desirable for dielectric fluid in liquid form to flow on the upper face of the condenser, i.e. on its face which faces the upper plate. Thus, as illustrated by broken lines in FIG. 2, it is notable according to the invention that the dielectric fluid in liquid form is discharged via the sides of the plate in the upper stages, falling onto the lower plate, with the dielectric fluid being able to pass into the recuperation container via the orifices 119, when this fluid is stagnating on the lower plate 107a.

According to a variant not represented, each, or at least some, of the upper plates can also be perforated, provided that the condenser which these perforated plates overlie is arranged such as to have a plane which is inclined relative to the plane of the corresponding plate. Thus, the water which flows through the upper plates via the perforations cannot stagnate between the condenser and the corresponding upper plate, and can flow on the sides in order to fall by means of gravity into the recuperation container.

With reference to FIG. 3, the recuperation container 108 is provided with a hose connection 113 for discharge of the dielectric fluid 1 recuperated in the interior of the recuperation container 108, the discharge hose connection 113 being in fluid communication with a duct 114 for recirculation of the dielectric fluid 1. The recirculation duct 114 is equipped with a pump 115 to bring the dielectric fluid 1 to each of the dielectric fluid inlets 23 which equip a condenser. Thus, the pump 115, which is common to each of the stages of battery elements of the cooling device 2, is able to supply with dielectric fluid 1 the series of dielectric fluid circuits 5 which the cooling device 2 comprises, which is advantageous in terms of production cost. It is understood that a distributor, not represented in the figure, can supply with dielectric fluid 1 the series of dielectric fluid circuits 5 which the cooling device 2 comprises, and which circuits equip a respective stage 106a, 106b of battery elements 103.

As illustrated, it is notable that the dielectric fluid inlets 23 are all arranged on the same side of each condenser 3, in order to facilitate the distribution of the dielectric fluid recuperated in the common recuperation container in each of the dielectric fluid inlets.

Each dielectric fluid circuit 5 is provided with at least one spraying nozzle 37 which can spray the dielectric fluid 1 in the liquid state towards the battery elements 103 in order to cool them. It is thus understood that the dielectric fluid 1 passes along a circulation loop 116 comprising the container 108 for recuperation of the dielectric fluid 1 in the liquid state, and the duct 114 for recirculation of the dielectric fluid 1 equipped with the pump 115, which, by means of recirculation means 117, jointly supply each dielectric fluid circuit 5 which equips a stage 106a, 106b of battery elements 103, with the nozzles 37 for spraying of the dielectric fluid circuits 5 sprinkling the battery elements 103 with dielectric fluid 1, which is vaporized in contact therewith, and is then liquefied in contact with the condensers 3 in order to drip by gravity into the interior of a common recuperation container 108. The advantageous nature of the present invention is understood, consisting in particular of mutualization of the cooling means described for each of the stages 106a, 106b of the stepped superimposed arrangement of the battery elements 103.

FIG. 4 represents a stage 106a, 106b of battery elements 103 according to a first variant embodiment. Each battery element 103 comprises a second housing 102 which accommodates a plurality of electrical storage cells 104. The second housing 102 comprises a cover 118, which has been removed from one of the second housings 102 in order to show the electrical storage cells 104. In this first variant embodiment, the dielectric fluid sprayed via the nozzles which equip the dielectric fluid circuit comes into contact with the second housing, and vaporizes under the effect of the heat released by this second housing. The cooling of this second housing gives rise to a drop in the temperature of the enclosure in which the electrical storage cells are accommodated, and thus to a drop in the temperature of the cells themselves.

FIG. 5 represents a stage 106a, 106b of battery elements 103 according to a second variant embodiment. Each battery element 103 comprises only one plurality of electrical storage cells 104. In this second variant embodiment, in which the electrical storage cells are directly facing the condenser, the dielectric fluid sprayed via the nozzles which equip the dielectric fluid circuit comes into contact directly with the electrical storage cells, and vaporizes under the effect of the heat released by each of these cells.

It is understood that each electrical storage cell 104 is the functional unit of the battery element 103, which supplies the electric motor at least partly with the electrical energy it needs. The electrical storage cell 104 is for example an ion-lithium cell or the like.

In FIG. 6, the condenser 3 is represented in an orthonormal reference system Oxyz comprising a longitudinal axis Ox, a lateral axis Oy, and a transverse axis Oz. The condenser 3 comprises a main wall 6 which extends in the interior of a plane parallel to the plane Oxy. The main wall 6 is arranged substantially in a quadrilateral comprising two longitudinal ends of the main wall 7a, 7b, which are opposite one another, and are arranged at a first distance D1 from one another, and two lateral ends of the main wall 8a, 8b, which are opposite one another and are arranged at a second distance D2 from one another.

According to the variant embodiment illustrated, the condenser 3 also comprises three secondary walls 9a, 9b, 9c, which extend respectively on a plane parallel to the plane Oyz. Amongst the three secondary walls 9a, 9b, 9c, a first lateral secondary wall 9a can be distinguished which equips a first longitudinal end of the main wall 7a, a second lateral secondary wall 9b which equips a second longitudinal end of the main wall 7b, and an intermediate secondary wall 9c which is interposed between the lateral secondary walls 9a, 9b, while in this case being placed at an equal distance from the first lateral secondary wall 9a and the second lateral secondary wall 9b.

The first lateral secondary wall 9a and the intermediate secondary wall 9c delimit together with a portion of the main wall 6 a first chamber boa which is designed to receive a first battery element 103. The second lateral secondary wall 9b and the intermediate secondary wall 9c delimit together with another portion of the main wall 6 a second chamber 10b which is designed to receive a second battery element 103.

The main wall 6 accommodates the cooling fluid circuit 4 which winds in the interior of the main wall 6, above the first chamber 10a and above the second chamber 10b. According to one embodiment, the cooling fluid circuit 4 is provided in a thickness of the main wall 6. According to another embodiment, the main wall 6 is formed of two shells opposite one another, at least one shell comprising a boss which delimits a cavity forming the cooling fluid circuit 4. In this case, the cooling fluid circuit 4 is provided in relief on at least one of the shells.

The main wall 6 comprises a first face 11a, which is the upper face in FIG. 6, and is provided with a cooling fluid inlet 12a and a cooling fluid outlet 12b. The cooling fluid inlet 12a is designed to permit intake of a cooling fluid 13 into the interior of the cooling fluid circuit 4, whereas the cooling fluid outlet 12b is designed to permit discharge of the cooling fluid 13 from the cooling fluid circuit 4. The cooling fluid 13 is for example carbon dioxide or the like. It is understood that, starting with circulation of the cooling fluid 13 in the interior of the cooling fluid circuit 4, the cooling fluid 13 cools the main wall 6, in order to maintain it at a temperature lower than a condensation temperature of the dielectric fluid 1, which guarantees that, in contact with the wall, the dielectric fluid 1 goes into the liquid state.

All of this can be seen more clearly in FIG. 7, where the cooling fluid inlet 12a and the cooling fluid outlet 12b are arranged in the vicinity of a first lateral end of the main wall 8a, and the cooling fluid circuit 4 extends from the cooling fluid inlet 12a to the cooling fluid outlet 12b. The cooling fluid circuit 4 comprises for example a plurality of branches for circulation of the cooling fluid 15, 17, 19, 21, which are arranged in parallel with one another. Thus, according to the example illustrated, the cooling fluid inlet 12a is in fluid communication with a distributor 14 which supplies three first branches 15 for circulation of the cooling fluid which are parallel with one another. These three first branches 15 for circulation of cooling fluid open into the interior of a first collector 16 which is arranged in the vicinity of a second lateral end of the main wall 8b. Thus, in the interior of the first branches 15 for circulation of cooling fluid, the cooling fluid 13 travels substantially the second distance D2. The first collector 16 is in fluid communication with three second branches 17 for circulation of cooling fluid, which are arranged in parallel with one another. The three second branches 17 for circulation of cooling fluid extend from the first collector 16 to a second collector 18 which is arranged in the vicinity of the first lateral end of the main wall 8a. Thus, in the interior of the second branches 17 for circulation of cooling fluid, the cooling fluid 13 travels again substantially the second distance D2. The second collector 18 is in fluid communication with three third branches 19 for circulation of cooling fluid, which are arranged in parallel with one another, with one of the third branches 19 for circulation of the cooling fluid bordering the second longitudinal end of the main wall 7b. The three third branches 19 for circulation of cooling fluid extend from the second collector 18 to a third collector 20, which is arranged in the vicinity of the second lateral end of the main wall 8b, and extends along the second lateral end of the main wall 8b, as far as the first longitudinal end of the main wall 7a. Thus, in the interior of the third branches 19 for circulation of cooling fluid, the cooling fluid 13 travels again substantially the second distance D2. Thus, in the interior of the third collector 20, the cooling fluid 13 travels substantially the first distance D1. The third collector 20 is in fluid communication with three fourth branches 21 for circulation of cooling fluid, which are arranged in parallel with one another, with one of the fourth branches 21 for circulation of the cooling fluid bordering the first longitudinal end of the main wall 7a. The three fourth branches 21 for circulation of cooling fluid extend from the third collector 20 to a fourth collector 22 which is provided with the cooling fluid outlet 12b. It is understood that the number of branches 15, 17, 19, 21 for circulation of cooling fluid placed between two collectors 16, 18, 20, or between a collector 16, 18, 20 and the distributor 14, as well as the number of collectors 16, 18, 20, can be different from those previously described.

The fact that the cooling fluid 13 travels the second distance D2 and the first distance D1 several times permits cooling of all of the surface of the main wall 6, and consecutively cooling of the dielectric fluid 1, which comes into contact with the main wall 6 after being vaporized in contact with the battery elements 103.

It is notable that the main wall and the different branches for circulation of the cooling fluid which are formed there are configured such that the cooling fluid circuit 4 is arranged in a central area 61 of the main wall 6.

After the description of the cooling fluid circuit 4, a description will now be provided of the dielectric fluid circuit 5, in particular with reference to FIGS. 6 to 9, with the dielectric fluid circuit 5 being provided in the thickness of the condenser, i.e. being incorporated in one and/or the other of walls which form the condenser 3.

As will be described hereinafter, and to continue the foregoing information provided concerning the position in a central area 61 of the cooling fluid circuit, the dielectric fluid circuit 5 is arranged in the condenser such as to leave clear this central area formed in the main wall, either by extending on walls of the condenser other than the main wall, and/or by extending on a peripheral area 60 of the main wall.

In particular, the circuit can be provided by means of embossing formed respectively in one and/or the other of two shells which form each of the walls once they are assembled against one another. In this context, and according to an embodiment which is shown more clearly in the exploded view in FIG. 9, the walls 6, 9a, 9b, 9c can be formed from three shells 301, 302, 303, which in particular are made of metal, and are shaped in the form of a "U", a first shell 301 of which accommodates a second shell 302 and a third shell 303, with the cooling fluid circuit 4 and the dielectric fluid circuit 5 being provided between the shells 301, 302, 303, in particular by means of embossing of the shells. The shells 301, 302, 303 are for example brazed or welded to one another. It is understood that, in this variant embodiment, the second shell and third shell have dimensions such as each to delimit a chamber for receipt of an electrical storage element.

The dielectric fluid circuit can be described in particular with reference to FIGS. 8 and 9, which illustrate this circuit schematically and in an exploded representation.

The first face 11a of the main wall 6 is provided with a dielectric fluid inlet 23, which is provided in the vicinity of the first lateral end of the main wall 8a. The dielectric fluid inlet 23 permits intake of the dielectric fluid 1 into the interior of the dielectric fluid circuit 5. The dielectric fluid inlet 23 is in fluid communication with a first dielectric fluid channel 24 which goes along the first lateral end of the main wall 8a, between the dielectric fluid inlet 23 and a first circulation point of the dielectric fluid 25, which point is situated plumb with the intermediate secondary wall 9c.

More particularly, the first dielectric fluid channel 24 can be formed by embossing formed in the first shell 301 which supports the dielectric fluid inlet, and by a flat surface of the second or third shell. Also, the first circulation point can be formed by two embossed portions facing one another, formed respectively in the walls of the second and third shells participating in forming the intermediate secondary wall.

The first circulation point 25 for the dielectric fluid is in fluid communication with a second dielectric fluid channel 26, which extends in the interior of the intermediate secondary wall 9c, as far as a second circulation point 27 for the dielectric fluid which is situated in the vicinity of the second lateral end of the main wall 8b. The second dielectric fluid channel 26 comprises two first branches 28 for circulation of the dielectric fluid which are parallel to one another.

The second point 27 for circulation of the dielectric fluid is in fluid communication with a third dielectric fluid channel 29 and a fourth dielectric fluid channel 30 which both extend along the second lateral end of the main wall 8b.

The third dielectric fluid channel 29 extends between the second point 27 for circulation of the dielectric fluid and a fourth point 31 for circulation of the dielectric fluid which is situated plumb with the first lateral secondary wall 9a.

The fourth point 31 for circulation of the dielectric fluid is in fluid communication with a fifth dielectric fluid channel 33, which extends in the interior of the first lateral secondary wall 9a, and comprises two second branches 34 for circulation of the dielectric fluid which are parallel to one another. The second branches 34 for circulation of the dielectric fluid extend from the second lateral end of the main wall 8b as far as the first lateral end of the main wall 8b.

The fourth dielectric fluid channel 30 extends between the second point 27 for circulation of the dielectric fluid and a fifth point 32 for circulation of the dielectric fluid which is situated plumb with the second lateral secondary wall 9b.

In the interior of the channels for circulation of the dielectric fluid, the dielectric fluid 1 travels substantially the second distance D2, which permits spraying of the dielectric fluid onto all of a first dimension, in this case the length, of the battery elements 103. In addition, the fact that the circulation channels comprise a plurality of branches for circulation of the dielectric fluid permits spraying of the dielectric fluid onto different heights of the battery elements, respectively at a second dimension of the battery elements parallel to the direction of stacking of the stages, and thus homogenization of the operation of cooling of the battery element concerned.

The fifth circulation point 32 for the dielectric fluid is in fluid communication with a sixth dielectric fluid channel 35, which extends in the interior of the second lateral secondary wall 9b, and comprises two third branches 36 for circulation of the dielectric fluid which are parallel to one another. The third branches 36 for circulation of the dielectric fluid extend from the second lateral end of the main wall 8b, as far as the first lateral end of the main wall 8b. Thus, in the interior of the sixth dielectric fluid channel 35, the dielectric fluid 1 travels substantially the second distance D2.

Each branch 28, 34, 36 for circulation of the dielectric fluid is equipped with a plurality of nozzles 37 for spraying the dielectric fluid 1 towards the chamber 10a, 10b, which the secondary walls 9a, 9b, 9c participate in bordering. According to the example illustrated, each branch 28, 34, 36 for circulation of the dielectric fluid is equipped with four spraying nozzles 37. The number of spraying nozzles 37 which equip a branch 28, 34, 36 for circulation of the dielectric fluid can be different.

It should be noted that the first branches 28 for circulation of the dielectric fluid are provided with a number of spraying nozzles 37 which is equivalent to twice the number of spraying nozzles 37 which equip respectively the second branches 34 for circulation of the dielectric fluid and the third branches 36 for circulation of the dielectric fluid, in order to spray dielectric fluid 1 towards the first chamber 10a and towards the second chamber 10b, because of the fact that the intermediate secondary wall 9c, which is equipped with the first branches 28 for circulation of the dielectric fluid, borders the two chambers 10a, 10b. It is understood that the spraying nozzles 37 which equip the second branches 34 for circulation of the dielectric fluid are designed to spray the dielectric fluid 1 towards the first chamber 10a, and the spraying nozzles 37 which equip the third branches 36 for circulation of the dielectric fluid are designed to spray the dielectric fluid 1 towards the second chamber 10b.

The description and the corresponding figures, in particular FIG. 9, illustrate well the characteristic according to which the cooling fluid circuit 4 is arranged only in the thickness of the main wall 6, and in a central area 61, whereas the dielectric fluid circuit 5 is configured to leave this central area clear, and not to detract from the action of the condenser on the vaporized dielectric fluid extends. In particular, the dielectric fluid circuit can extend in the thickness of one and/or the other of the secondary walls 9a, 9, 9c, and it can extend on the border of the main walls, in a peripheral area 60.

The invention claimed is:

1. A condenser of a device for cooling at least one battery element of a motor vehicle, the condenser comprising:
    a main wall comprising a first thickness;
    a plurality of secondary walls configured to project from the main wall, where the plurality of secondary walls at least partially delimit a chamber configured to receive the at least one battery element, and where each secondary wall of the plurality of secondary walls comprises a second thickness;
    a cooling fluid circuit disposed in the first thickness of the main wall; and
    at least one dielectric fluid circuit disposed in the second thickness of each secondary wall of the plurality of secondary walls, the at least one dielectric fluid circuit comprising at least one nozzle for spraying a dielectric fluid in a liquid state on the at least one battery element,
    wherein the dielectric fluid is vaporized by the at least one battery element, thereby producing a vaporized dielectric fluid, and
    wherein the cooling fluid circuit is configured to circulate a cooling fluid through the main wall in order to reduce a temperature of the main wall such that the main wall liquefies the vaporized dielectric fluid when deposited thereon.

2. The condenser as claimed in claim 1, wherein the cooling fluid circuit is provided only in the first thickness of the main wall, and wherein the at least one dielectric fluid circuit extends in the first thickness of the main wall and in the second thickness of each secondary wall of the plurality of secondary walls.

3. The condenser as claimed in claim 2, wherein the at least one dielectric fluid circuit is disposed in a peripheral area of the main wall, and wherein the cooling fluid circuit is disposed in a central area of the main wall.

4. The condenser as claimed in claim 2, wherein a single side of the main wall comprises: a dielectric fluid inlet, a cooling fluid inlet, and a cooling fluid outlet.

5. The condenser as claimed in claim 1, wherein the plurality of secondary walls comprise:
    a first lateral secondary wall configured to project from a first longitudinal end of the main wall,
    a second lateral secondary wall configured to project from a second longitudinal end of the main wall, and
    an intermediate secondary wall disposed between the first lateral secondary wall and the second lateral secondary wall,
    wherein the intermediate secondary wall, the main wall, the first lateral secondary wall, and the second lateral secondary wall collectively delimit two chambers that are each configured to receive a corresponding battery element.

6. The condenser as claimed in claim 5, wherein the at least one dielectric fluid circuit comprises a plurality of branches disposed in parallel on each secondary wall of the plurality of secondary walls.

7. The condenser as claimed in claim 5, wherein the at least one nozzle comprises a plurality of spraying nozzles that are disposed on opposing faces of the intermediate secondary wall.

8. The condenser as claimed in claim 1, wherein the main wall and each secondary wall of the plurality of secondary walls are formed comprising two opposing shells, where at least one shell of the two opposing shells comprises a boss that delimits a cavity forming part of the cooling fluid circuit or part of the at least one dielectric fluid circuit.

9. The condenser as claimed in claim 1, wherein the main wall and the plurality of secondary walls are formed from three shells each having a "U" shape, where a first shell of the three shells straddles both a second shell and a third shell disposed side by side with the second shell, and where the cooling fluid circuit and the at least one dielectric fluid circuit are formed by deformations on the three shells.

10. A cooling device comprising:
    a first housing;
    a plurality of stages of battery elements disposed in the first housing,
        where each stage of the plurality of stages of battery elements comprises a corresponding condenser as claimed in claim 1, and
        where the corresponding condenser is disposed relative to the battery elements of the stage such that the spraying nozzles spray the dielectric fluid onto the battery elements, and
    a container configured to receive the dielectric fluid from each stage of the plurality of stages of battery elements; and
    a recirculation duct comprising a pump,
    wherein the recirculation duct is configured to connect the container to at least one dielectric fluid inlet of at least one dielectric fluid circuit of the corresponding condenser of each stage of the plurality of stages of battery elements.

* * * * *